United States Patent [19]
Nakanishi

[11] Patent Number: 5,828,739
[45] Date of Patent: Oct. 27, 1998

[54] PORTABLE COMMUNICATION DEVICE FOR DISPLAYING A CALLING PARTY TO BE CALLED WHEN ACTUATED

[75] Inventor: Kosuke Nakanishi, Tokyo, Japan

[73] Assignee: Sony Corporation, Tokyo, Japan

[21] Appl. No.: 664,511

[22] Filed: Jun. 17, 1996

[30] Foreign Application Priority Data

Jun. 19, 1995 [JP] Japan ..................................... 7-151963

[51] Int. Cl.$^6$ ........................... H04M 15/00; H04M 1/00; H04Q 7/00
[52] U.S. Cl. ........................... 379/140; 379/354; 379/355; 379/142; 455/564
[58] Field of Search ..................................... 379/130, 131, 379/140, 141, 142, 354, 355, 356, 357; 455/415, 405, 407, 462, 564

[56] References Cited

U.S. PATENT DOCUMENTS

| | | | |
|---|---|---|---|
| 5,267,308 | 11/1993 | Jokineen et al. ......................... | 379/354 |
| 5,390,236 | 2/1995 | Klausner et al. ......................... | 379/354 |
| 5,625,683 | 4/1997 | Nazanin et al. ......................... | 379/354 |
| 5,684,873 | 11/1997 | Tiilikainen ............................... | 379/354 |

*Primary Examiner*—Paul Loomis
*Attorney, Agent, or Firm*—Jay H. Maioli

[57] ABSTRACT

A portable telephone designed so that a person who found the portable telephone is able to communicate easily with the owner. If the person who found the lost telephone turns on a power source, a CPU 11 of the portable telephone reads out data of the name and the telephone number of the owner of the portable telephone stored in a RAM 7, and causes the name and the telephone number corresponding to the data to be displayed on a display 8. The person who found the telephone enters a pre-set abbreviated dial number on an actuating portion 6 for having communication with the telephone owner. The CPU 11 then transmits the DTMF signal from a dialing circuit 9 based on the telephone number data stored in the RAM 7. After the person who found the telephone has had a call with the telephone owner, the CPU 11 ceases to accept the operation other than the operation of entering the pre-set abbreviated dial number and causes the power source to be turned off.

5 Claims, 7 Drawing Sheets

ショユウシャトウロク
YES=1　　NO=3

ショウキョ？
YES=1　　NO=3

FIG.7

PORTABLE COMMUNICATION DEVICE FOR DISPLAYING A CALLING PARTY TO BE CALLED WHEN ACTUATED

BACKGROUND OF THE INVENTION

1. Field of the Invention

This invention relates to a portable telephone. More particularly, it relates to a potable telephone for displaying the telephone number, for example, of the owner on power up.

2. Description of the Related Art

Since a portable telephone is transportable, it tends to be lost. Although it may be contemplated to affix a paper sheet stating the destination for communication on a main body portion of the telephone in case of loss, such paper sheet tends to be peeled off, or the telephone is impaired in appearance.

The portable telephone has the function of displaying the number of its own station, that is the telephone number allocated to it. However, this function cannot be exploited in case of loss. That is, since the portable telephone can only display the telephone number of its own station, person who found the lost portable telephone cannot have direct contact with its owner.

If plural telephone sets of the same type are used in a company, the company name or mark is occasionally affixed to the telephone sets. In such case, if the telephone set is lost, it is not returned directly to the user, but is returned via the company. On the other hand, the user cannot distinguish the telephone set he or she is using from the telephone sets used by others, such that the user may occasionally use the telephone sets of others by mistake.

As described above, sufficient precautions have not been given in the conventional portable telephone against loss. This has given rise to many inconveniences.

SUMMARY OF THE INVENTION

It is therefore an object of the present invention to provide a portable telephone in which one who has found a lost portable telephone may readily apprise the owner of that effect.

According to the present invention, there is provided a portable communication device including storage means for storing the information on a destination of communication, display means for displaying the destination of communication and control means for causing the information on the destination of communication to be read out from the storage means on power up and for displaying the destination of communication on the display means responsive to the read-out information.

The storage means stores the information on the destination for communication. On power up, the control means reads out the information on the destination for communication from the storage means, and indicates the destination for communication corresponding to the read-out information on display means. If the information corresponding to the pre-set actuation from the actuating means is entered, the controlling means transmits the dialing signal from the transmitting means based on the information on the destination for communication read out from the storage means.

DESCRIPTION OF THE PREFERRED EMBODIMENTS

Referring to the drawings, a preferred embodiment of the present invention will be explained in detail.

Figure 1:
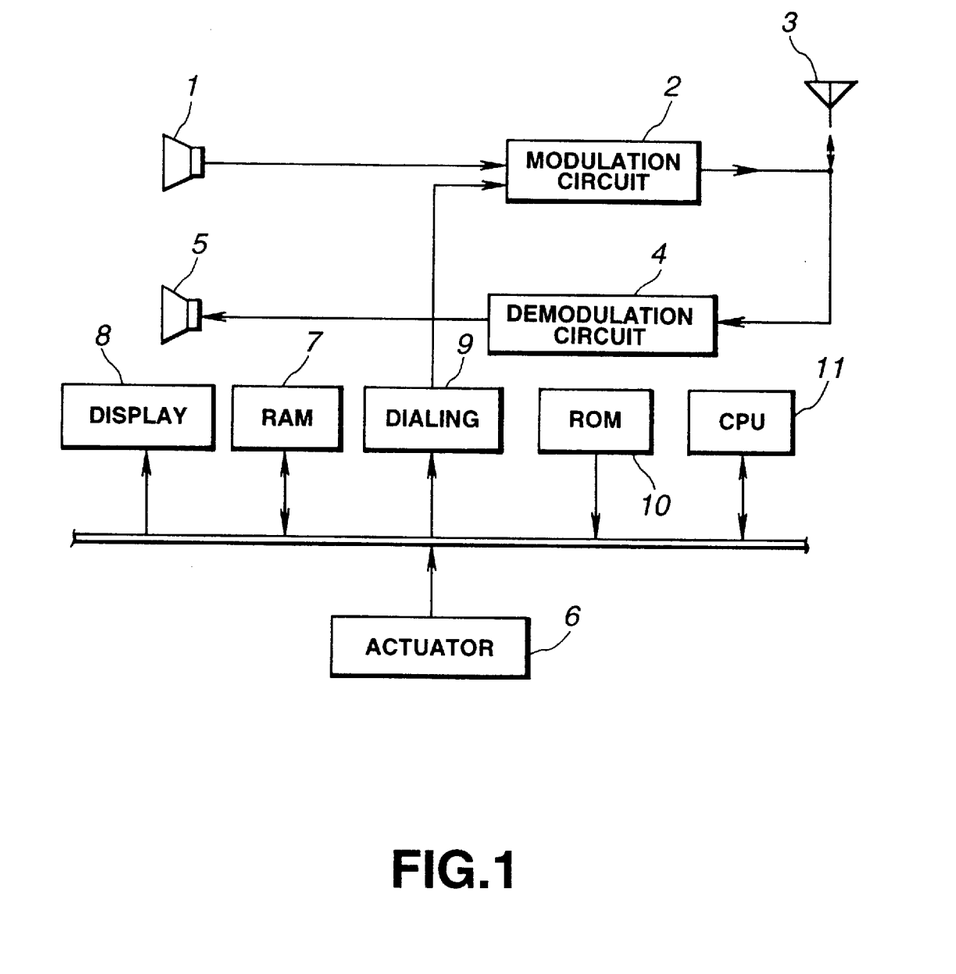
FIG. 1 is a block diagram showing an illustrative circuit structure of a portable telephone embodying the present invention.

Referring to FIG. 1, a portable telephone according to the present invention has a microphone 1 for converting speech into speech signals, a modulation circuit 2 for modulating the speech signals from the microphone 1 and an antenna 3 for transmitting the modulated signal from the modulation circuit 2 as an electrical wave and also for receiving the electrical wave. The portable telephone also includes a demodulation circuit 4 for demodulating a signal received over the antenna 3, a speaker 5 for converting speech signals from the modulation circuit 4 into speech, and an actuator 6 for entering the telephone number or the name. The portable telephone also includes a RAM 7 for storing the telephone number, name or the like from the actuator 6, a display 8 for displaying the telephone number, name or the like, and a dialing circuit 9 for transmitting a pushbutton dial signal or dial tone multi-frequency (DTMF) signal. The portable telephone further includes a ROM 10 having pre-stored therein a program for controlling the above-mentioned various circuits and a CPU 11 for controlling various circuits based on the program stored in the ROM 10. The name or the telephone number entered by the actuator 6 is referred to hereinafter as "data".

With the present portable telephone, if the user actuates the actuator 6 for entering the telephone number of a called party, a dial signal is transmitted, so that a telephone line for a call is established. The microphone 1 converts the speech of the user into speech signals which are supplied to the modulation circuit 2. The modulation circuit 2 modulates the supplied speech signals and routes the modulated signal to the antenna 3. The antenna transmits the modulated signal as an electrical wave. The electrical wave corresponding to the speech signals of the called party is received by the antenna 3. The demodulation circuit 4 demodulates the signal received by the antenna 3 and routes the demodulated signal to the speaker 5, which then converts the speech signals into speech. This enables the user to have a talk with the called party.

The portable telephone can pre-store the telephone number and the name. Similarly to the usual portable telephone, the present portable telephone can store the telephone number corresponding to the abbreviated number in the RAM 7 comprised of, for example, a non-volatile memory, so that, if the user enters the abbreviated number, it can automatically transmit the DTMF signal. In addition, data concerning the destination for communication concerning the user is pre-stored in the RAM 7, so that, on power up, the telephone number and the name are indicated on the display 8.

Figure 2:
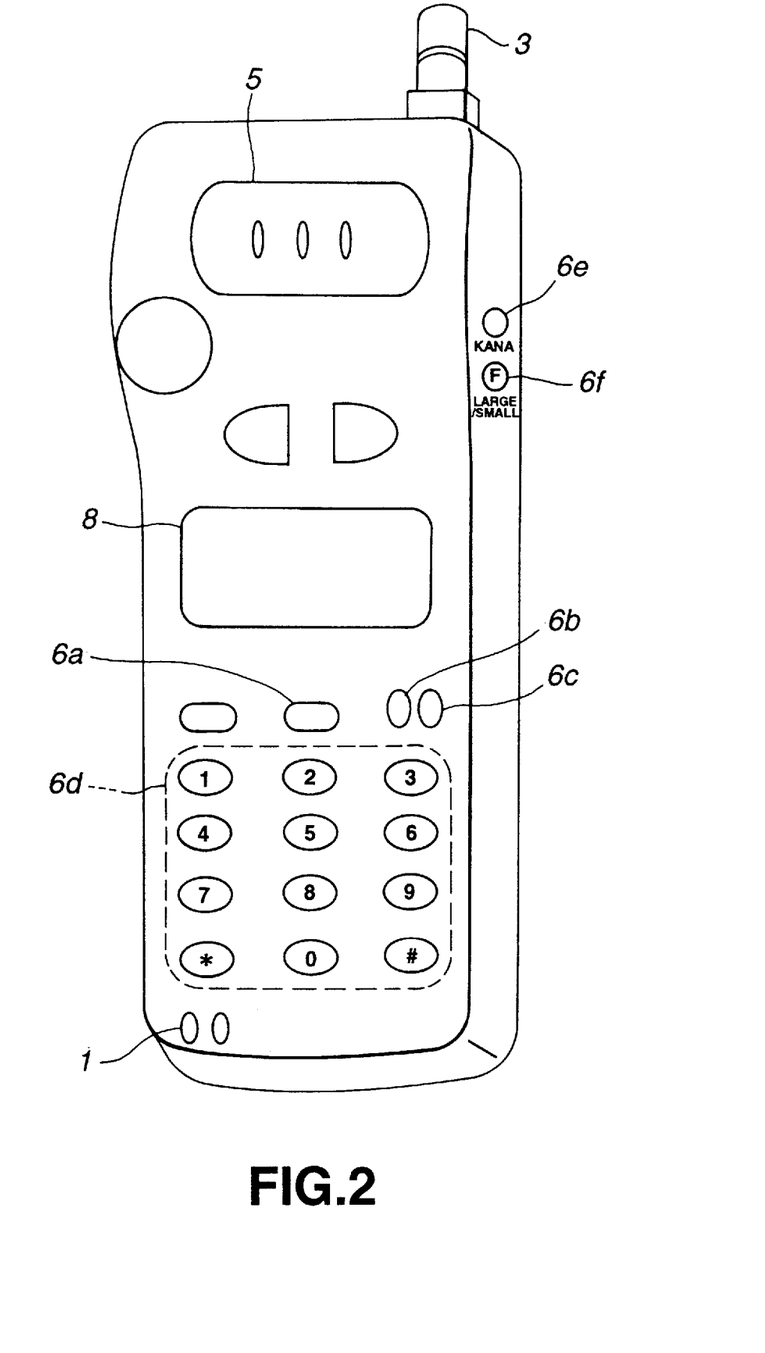
FIG. 2 is a perspective view of the portable telephone.
Figure 3:
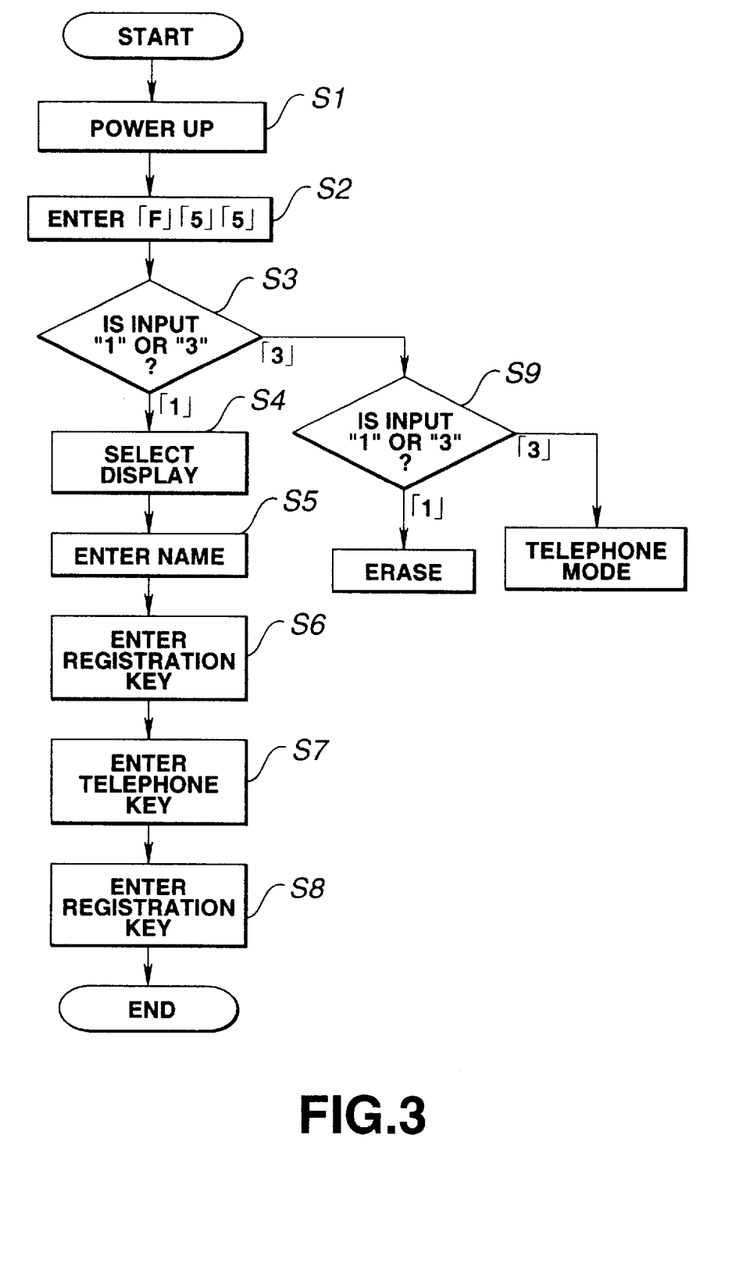
FIG. 3 is a flow chart for illustrating the operation of registration of the telephone number or the like of the portable telephone.

Referring to FIGS. 2 through 4, the operation of registration of the telephone number and the name will be explained.

Referring to FIG. 2, the portable telephone has the antenna 3 on its upper surface, while having, on its front surface, the above-mentioned speaker 5, display 8, an end key 6a, a registration key 6b, a clear key 6c and a number key 6d, constituting the actuator 6, and the microphone 1. The portable telephone also has, on its right-hand side face, an kana/alphabet changeover key 6e and a large/small switching-function key 6f similarly constituting the actuator 6.

If the user actuates at step S1 a power source switch, not shown, for turning on the power source, as shown in FIG. 3, the CPU 11 of the portable telephone is in a usual telephone mode, that is in a state of allowing for phoning.

Figure 4A:
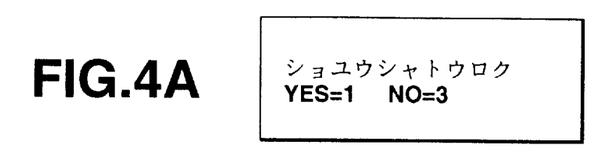
FIGS. 4A to 4C illustrate examples of display made on a display during operation of the portable telephone.

If the user thrusts "F" of the function key 6f and thrusts "5" of the number key 6d twice at step S2, the CPU 11 is set to the owner registration mode, that is to a state in which the name and the telephone number of the owner can be entered for indicating the name and the telephone number in the display mode as later explained. Thus the CPU makes an indication on the display 8 for prompting the user to make a selection of whether an owner registration should be made, as shown in FIG. 4A.

Figure 4B:
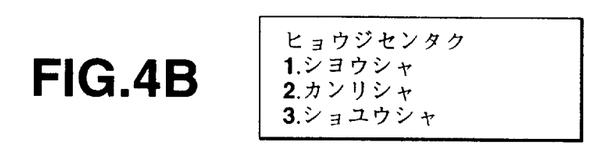
Figure 4C:
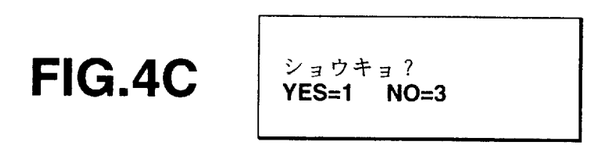
Figure 4D:
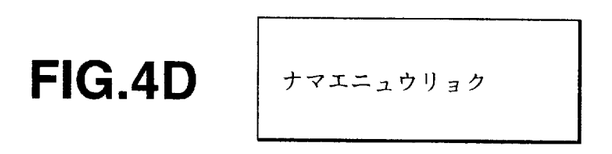

At step S3, the user thrusts "1" or "3" of the number key 6d. If "1" of the number key is thrust, the CPU 11 indicates, on the display 8, the contents to be shown on the display 8 on power up in the display mode as will be later explained, such as the user, supervisor or the owner, as shown in FIG. 4B. If "3" of the number key 6d is thrust, the CPU 11 makes indications on the display 8 for erasure confirmation of the pre-registered name and telephone number of the user from the RAM 7, as shown in FIG. 4C.

If, at step S4, the user thrusts "1", "2" or "3" of the number key 6d, indicated on the display 8, as shown in FIG. 4B, the CPU 11 causes data corresponding to "3", referred to hereinafter as selected data, to be stored in the RAM 7, responsive to the thrusting operation. The CPU 11 then makes indications on the display 8 for prompting the user to enter the name.

Figure 4E:
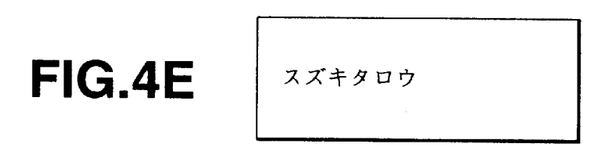

If, at step S5, the user thrusts the number key 6d for entering the name, the CPU 11 routes name data supplied from the actuator 6 to the display 8 for indicating the entered name on the display 8 as shown for example in FIG. 4E. If the name is entered, the CPU 11 switches between the alphabet entry state and the kana entry state each time the user thrusts the kana/alphabet switching key 6e. If, in the alphabet entry state, the large/small switching key 6f is thrust, the CPU 11 switches between the entry of the large (upper case) letter and entry of the small (lower case) letter. As an example of the katakana and the alphabet allocated to the number key 6d, Tables 1 and 2 illustrate the allocation of katakana and alphabetical letters, respectively.

TABLE 1

| KEY | PUSH→ | PUSH→ | PUSH→ | PUSH→ | PUSH→ | PUSH→ | (PUSH→) |
|---|---|---|---|---|---|---|---|
| 1 | A | I | U | E | O | 1 | |
| 2 | KA | KI | KU | KE | KO | 2 | |
| 3 | SA | SHI | SU | SE | SO | 3 | |
| 4 | TA | CHI | TSU | TE | TO | 4 | |
| 5 | NA | NI | NU | NE | NO | 5 | |
| 6 | HA | HI | HU | HE | HO | 6 | |
| 7 | MA | MI | MU | ME | MO | 7 | |
| 8 | YA | YU | YO | YA | YU | YO | 8 |
| 9 | RA | RI | RU | RE | RO | 9 | |
| * | WA | WO | N | — | . | . | * |
| 0 | TSU | A | I | U | E | O | 0 |
| # | (TO BE USED FOR ROW FEED) | | | | | | |

ONLY 8, * AND 0 KEYS IN BRACKETS

TABLE 2

| KEY | PUSH→ | PUSH→ | PUSH→ | PUSH |
|---|---|---|---|---|
| 1 | / | : | — | 1 |
| 2 | A | B | C | 2 |
| 3 | D | E | F | 3 |
| 4 | G | H | I | 4 |
| 5 | J | K | L | 5 |
| 6 | M | N | O | 6 |
| 7 | P | R | S | 7 |
| 8 | T | U | V | 8 |
| 9 | W | X | Y | 9 |
| 0 | Q | Z | & | 0 |
| * | . | # | . | * |
| # | (FOR ROW FEED) | | | |

Figure 4F:
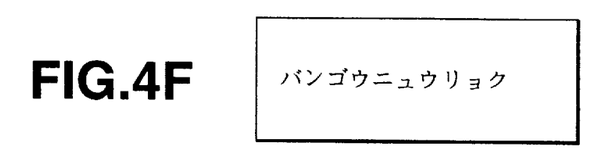

If, at step S6, the user thrusts the registration key 6b, the CPU 11 causes data of the name from the actuator 6 to be stored in the RAM 7, while making an indication on the display 8 for prompting the user to enter the telephone number, as shown for example in FIG. 4F.

Figure 4G:
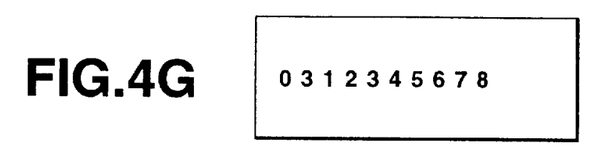

If the user actuates at step S7 the number key 6d for entering the telephone number, the CPU 11 causes data of the telephone number supplied from the user 6 to be supplied to the display 8 for indicating the entered telephone number, as shown in FIG. 4G.

If the user thrusts the registration key 6b at step S8, the CPU 11 causes the telephone number data from the actuator 6 to be stored in the RAM 7 to terminate the owner registration mode.

If the user thrusts "1" or of the number key 6d at step S9, the CPU 11 erases data of the name or the telephone number stored in the RAM 7. If the user thrusts "3" of the number key 6d at step S9, the CPU 11 switches the mode from the owner registration mode to the telephone call mode.

If the user thrusts the clear key 6c in the course of entering the telephone number or the like, the CPU 11 cancels the registration operation going on at such time to restore the initial state, such as the "start" state shown in FIG. 3. The sequence of entering the telephone number or the operating method is not limited to the above-described illustrative example.

Figure 5:
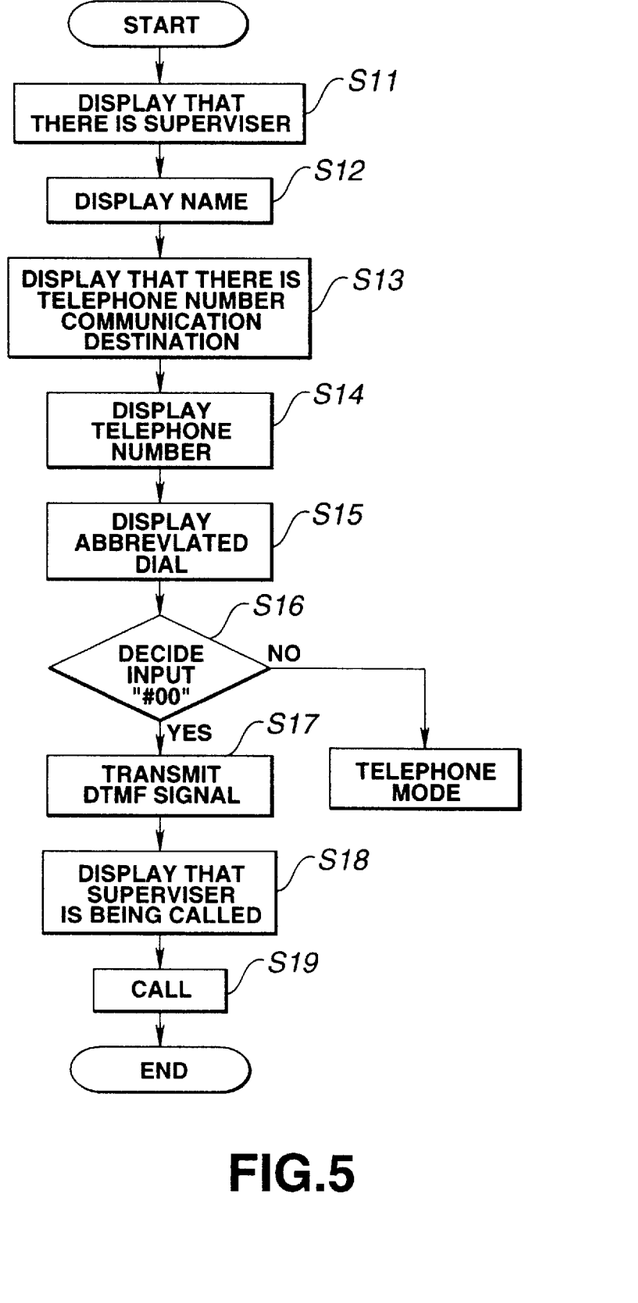
FIG. 5 is a flowchart for illustrating the operation for displaying the address of communication of the portable telephone.

The display mode of the portable telephone, that is the mode of operation for displaying the destination for communication, which may be established when the portable telephone is lost and the person who found the telephone turned on the power source of the telephone, is now explained by referring to FIGS. 5 and 6.

Figure 6A:
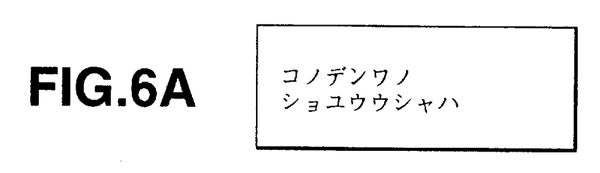
FIGS. 6A to 6F illustrate examples of display made on a display during retrieval operation of the portable telephone.

If the person who found the telephone actuates the power source at step S11 to turn on the power source, the CPU 11 makes indications on the display 8 stating that the name of the owner is about to be displayed for a pre-set time, such as for two seconds, based on the above-mentioned selected data "3", as shown in FIG. 6A. The processing then transfers to step S12.

Figure 6B:
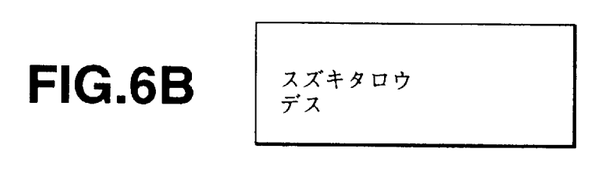

At step S12, the CPU 11 reads out the name data stored in the RAM 7 and indicates the name of the owner on the display 8 such as for two seconds, as shown in FIG. 6B. The processing then transfers to step S13.

Figure 6C:
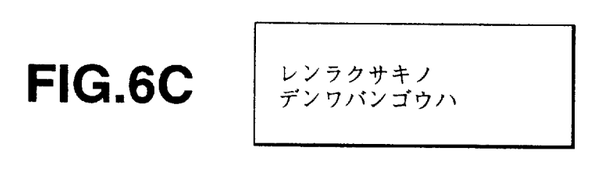

At step S13, the CPU 11 makes indications such as for two seconds that the telephone number of the destination for communication is about to be displayed, as shown in FIG. 6C. The processing then transfers to step S14.

Figure 6D:
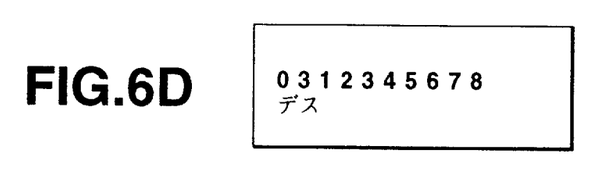

At step S14, the CPU 11 reads out the telephone number data stored in the RAM 7, and causes the telephone number of the owner to be indicated on the display 8, such as for two seconds, as shown for example in FIG. 6D. The processing then transfers to step S15.

Figure 6E:
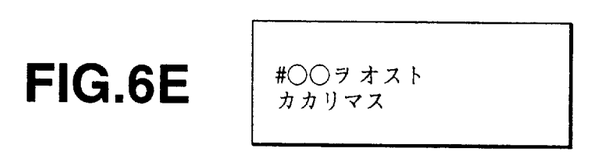

At step S15, the CPU 11 makes an indication suggesting that a call may be placed on the owner on thrusting a pre-set abbreviated dial, such as "#00", on the display 8, such as for two seconds, as shown for example in FIG. 6E. The processing then transfers to step S16.

At step S16, the CPU 11 judges whether the pre-set key of the number key 6d, such as "#00", has been thrust. If the key "#00" is thrust, the processing transfers to step S17 and, if a key other than "#00" is thrust, the CPU restores the usual telephone mode.

At step S17, the CPU 11 causes the telephone number data stored in the RAM 7 to be read out. The CPU then causes the DTMF signal to be sent from the dialing circuit 9 based on the read-out data. The processing then transfers to step S18. The transmitted DTMF signal is modulated by the modulating circuit 2 and transmitted over the antenna 3.

Figure 6F:
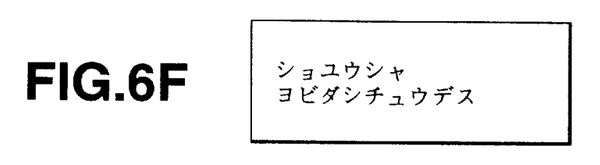

At step S18, the CPU 11 makes on the display 8 an indication stating that the owner who is the destination for communication is being phoned for e.g., two seconds, as shown for example in FIG. 6F. The processing then transfers to step S19.

At step S19, the person who found the telephone can talk with the owner over the telephone. If, after end of the talk over the telephone, the end key 6a is thrust, the CPU 11 sets a key lock mode, that is, it becomes unable to accept the number key 6d other than "#00", and causes the power source to be turned off. Thus the person who found the telephone becomes unable to phone to any person other than the owner.

Figure 7:
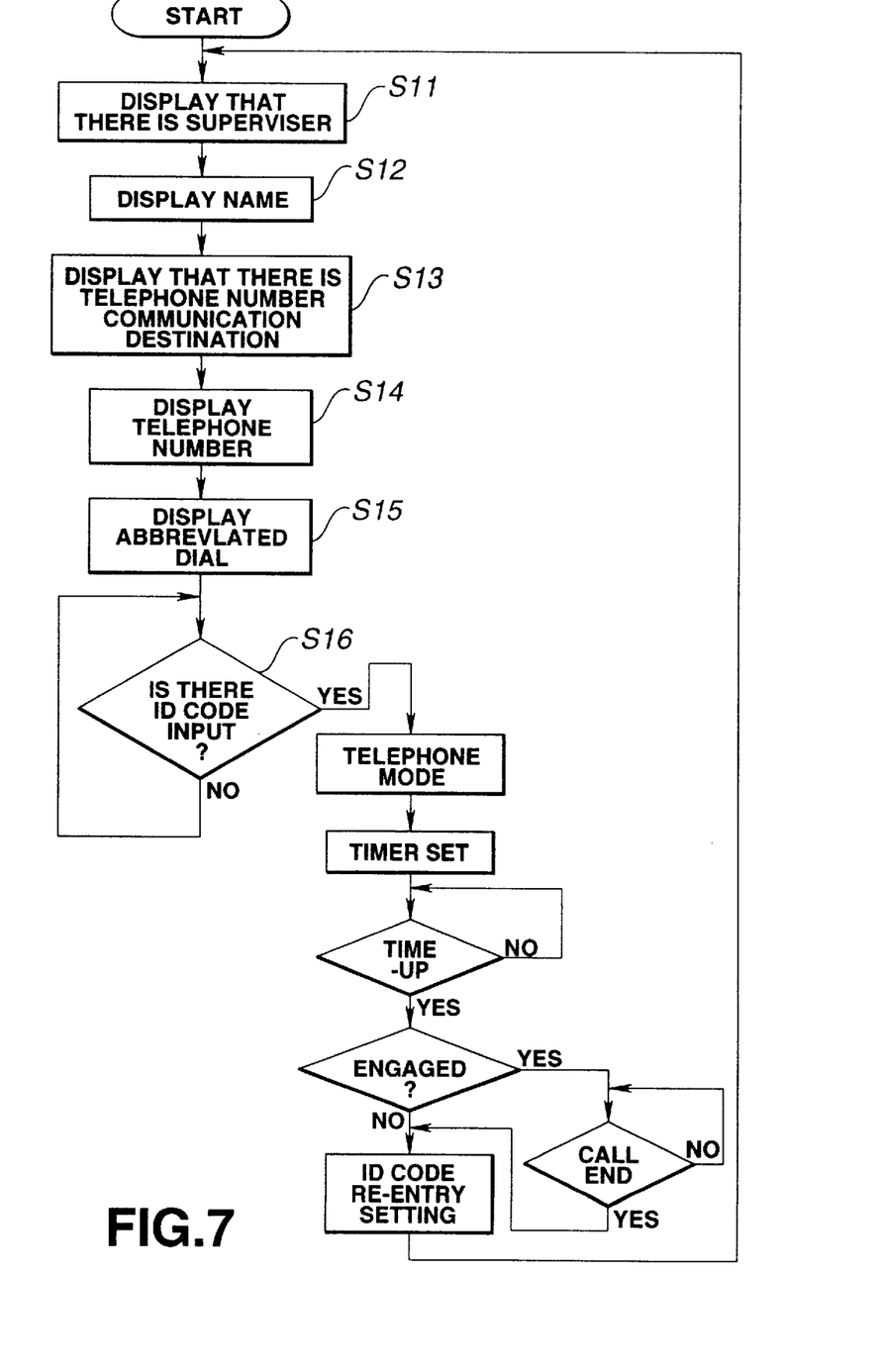
FIG. 7 is a fowchart for illustrating the function of limiting the use of the portable telephone.

FIG. 7 illustrates the function for prohibiting a lost portable telephone from being used by others without authorization. In the present embodiment, a timer is started in association with the network connection operation for having a call. This timer is set by the user by actuating corresponding actuating means. For example, the time period of 12 hours or 24 hours is set depending on the state of use per month. In addition, a pre-set identification (ID) code is also entered by the user by actuating this actuating means. When the timer set time has elapsed, it is judged whether or not the mode is the call mode. If the mode is not call mode, a standby mode is set, in which the telephone awaits entry of an appropriate input at the start time of the next call. If the mode is the call mode, the end of call is detected, such as by detecting the operation for call end, after which the standby state of awaiting the entry of the appropriate ID code is set. Thus, if the appropriate ID code is not entered each time the time set on the timer has elapsed, phoning becomes impossible, such that the telephone cannot be used by others without authorization.

With the present portable telephone, as described above, the destination for communication, such as name and telephone number of the owner, is stored in anticipation of loss and, on power up, the name and the telephone number is indicated on the display, so that a person who has found the telephone can easily communicated with the owner of the portable telephone.

The operation for indicating the destination for communication is not limited to that described in connection with the present embodiment. For example, the name and the telephone number may be indicated simultaneously, or the display may be sustained until some actuation is done next.

I claim:

1. A portable communication device comprising:
   storage means for storing a name and telephone number of an owner of the portable communication device;
   display means for displaying said name and said telephone number of the owner; and
   control means for reading said name and said number of the owner from said storage means and for displaying said name and said number on said display means when the portable communication device is turned on by a finder of the portable communication device, thereby allowing the finder of the portable communication device to call the owner of the device.

2. The portable communication device as claimed in claim 1, wherein said control means displays said name and said telephone number on said display means for a pre-set period of time.

3. The portable communication device as claimed in claim 1, further comprising:
   network connection means for establishing a network connection; and
   a plurality of push-button keys, wherein said control means controls said network connection means in response to a pre-set sequence entered by the finder using said plurality of push-button keys based on said name and said telephone number of the owner read from said storage means to establish a network connection with the telephone number of the owner.

4. The portable communication device as claimed in claim 3, further comprising:
   code storage means for storing a pre-set code entered by the owner using said plurality of push-button keys;
   a timer; and
   code re-setting means for re-setting said pre-set code in said code storage means in response to recognition of a pre-set time by said timer, wherein said control means disables said network connection means when said pre-set code is re-set and enables said network connection means when said pre-set code is entered by the user using said plurality of push-button keys, thereby stopping the finder of the portable communication device from using the device.

5. The portable communication device as claimed in claim 1, further comprising:
   a plurality of push-button keys, wherein said control means causes said name and said telephone number of the owner of the portable communication device to be written in said storage means when said plurality of push-button keys are operated.

* * * * *